April 21, 1970 H. H. BERRY 3,507,269

CLINICAL DIAGNOSTIC DEVICE FOR HALITOSIS

Filed April 26, 1965

INVENTOR.
HOMER H. BERRY
BY
Fishburn and Gold
ATTORNEYS 3,507,269
Patented Apr. 21, 1970

3,507,269

CLINICAL DIAGNOSTIC DEVICE FOR HALITOSIS

Homer H. Berry, Kansas City, Mo.
(1110 River Ave., Jonesboro, Ind. 46938)

Filed Apr. 26, 1965, Ser. No. 450,959
Int. Cl. A61b 5/00
U.S. Cl. 128—2 7 Claims

ABSTRACT OF THE DISCLOSURE

A clinical diagnostic device for aiding in determining the causative factors of halitosis of a person, the carrier having a portion adapted for insertion into the oral cavity of a person for contact with oral moisture therein with a plurality of exposed absorbent members on said portion with each of said absorbent members chemically sensitized and responsive to a respective agent associated with production of offensive odors or halitosis.

This invention relates to diagnostic devices and procedures for aiding in determining the causative factors of halitosis.

One of the most frequent complaints of dental patients concerns offensive breath. Exhaled breath is normally devoid of unpleasant odors, or may include faint, unoffensive odorous traces. Halitosis, or offensive breath, may arise from abnormal conditions at many locations in the body, for example, the teeth, gums, soft structures of the oral cavity, nasopharyngal region, digestive tract, bronchopulmonary area and genital-urinary region. It may be attributed to a wide variety of metabolic disorders as well as febrile, allergic, cancerous, infectious, and traumatic conditions. Thus, the presence of these odors may indicate a pathological condition, and specific odors frequently are clues to particular abnormalities. However, the halitosis is often caused by entirely non-pathological circumstances such as the consumption of large quantities of sulfur-containing compounds, for example, eggs, cheese, milk, and other dairy products which results in the production of highly offensive hydrogen sulfide and related mercaptans. Frequently the use of tobacco may account for the disagreeable odor, as well as garlic, onions, and intoxicating beverages.

Whether or not halitosis is due to a pathological condition or merely the result of ingesting particular foods or the exposure to odor producing agents, knowledge of the specific presence or absence of certain substances and conditions in the saliva and breath is of great help in determining the cause of the foul odor or at least indicating the desirability of specialized diagnostic testing.

The principal objects of the present invention are: to provide a device and method by which a patient may be quickly and easily tested for the presence or absence of certain specific substances and conditions as an aid to determining the cause of halitosis; to identify a particular group of such substances and conditions which are subject to analysis by simple means; to provide such a device and method which simultaneously indicates six separate substances or conditions in the oral cavity from which indication a great amount of diagnostic information is presented; to provide such a device which is small in size, safe to use and relatively inexpensive to produce; to provide such a device which is stable in storage and yet quickly operative; to provide such a device and method which does not require unusual or specialized skill to use and is unobjectionable to the patient; and to provide such a diagnostic device and method which is sensitive and reliable.

Other objects and advantages of this invention will become apparent from the following description taken in connection with the accompanying drawings wherein are set forth by way of illustration and example certain embodiments of this invention.

Figure 1:
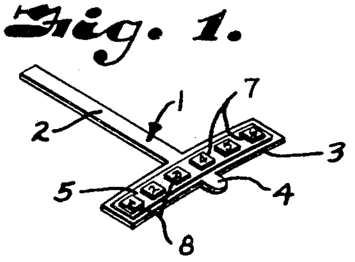
FIG. 1 is a perspective view of a diagnostic device embodying this invention.
Figure 2:
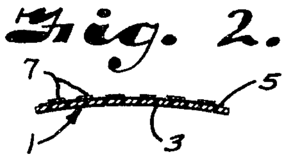
FIG. 2 is a transverse cross-sectional view through the device of FIG. 1, showing details of the structure thereof.

The reference numeral 1 generally indicates a device embodying this invention and having an elongated stem 2 for grasping by the fingers and an end-to-end curved cross-bar 3 extending transversely near one end of the stem 2. A central tip member 4 is provided as an aid in handling. The stem and cross-bar are preferably integral and constructed of a suitable substantially rigid material which is inert when exposed to the environment of the oral cavity, such as one of several relatively inexpensive synthetic plastic resins. A strip of inert tape 5 is secured along the convex side of the cross-bar 3 and carries six absorbent members generally designated 7 mounted thereon in side-by-side exposed relation by a suitable inert adhesive.

The members 7 each have identifying means, in the illustrated example taking the form of indicia 8 printed thereon, the indicia here being the numbers 1 through 6. The members 7 are preferably comprised of filter paper pads approximately 4 to 6 millimeters on each side and provide sensitive exposed areas for analysis as noted below.

The member 7 having the indicia 1 thereon is sensitized to hydrogen sulfide, which is perhaps the most common compound causing halitosis. In order to sensitize this member to the presence of hydrogen sulfide, a 2% solution of lead acetate is applied thereon and allowed to air dry. In the presence of hydrogen sulfide the member will turn from a white or very light gray color to a darker gray or black depending upon the concentration of exposure. A 2% solution of silver nitrate may be used instead of the lead acetate and will produce essentially the same color reaction. The presence of methyl mercaptan will cause a color change similar to hydrogen sulfide. It is noted that the hydrogen sulfide and methyl mercaptan under some circumstances might be found primarily on the breath and not in the saliva. If this differentiation is desired, the device may be first exposed to the exhaled breath rather than wetting with saliva.

The member 7 identified by indicia 2 is sensitive to sulphur dioxide, which is also a common cause for odor production and is usually thought to result from normal metabolic processes associated with eating certain foods. This member is sensitized by soaking with a 2% solution of stannous chloride which is then permitted to air dry. The member will turn a rust red on exposure to sulphur dioxide.

The member 7 having the indicia 3 thereon is sensitive to a common ingredient associated with tobacco, i.e., succinic acid. If a positive reaction to succinic acid is noted it may be deduced that a large proportion of the offending odor is due to the use of tobacco. To sensitize this member, oxine powder may be introduced on to the member in the dry state, or a 0.1% solution of oxine powder in acetone may be applied which is subsequently allowed to air dry. The presence of succinic acid will be indicated by the member turning from white to a light green.

The member 7 carrying indicia 4 is sensitized to pH or hydrogen ion concentration. It is important to have the ability of detecting abnormal shifts, both acid and alkaline, from the normal saliva pH of 6.9. An abnormal shift to the acid side may indicate the presence or at least the susceptibility to dental decay and the more alkaline conditions point to calculus formation and the resultant likelihood of periodontal diseases associated therewith. In order to indicate the shift in either direction accurately with a single member, three indicators are used for sensitization, methyl red which reacts in a range of 4.4–6.0, bromthymol blue which reacts in ranges of 6.0 to 7.6 and from 8.2 to 9.8, and phenol red which reacts in a range from 6.6 to 8.2. More specifically, 20 mg. of phenol red is dissolved in 100 cc. of 95% ethanol; one gm. of methyl red is dissolved in 300 cc. of 95% ethanol and 500 cc. of water; and 40 mg. bromthymol blue is dissolved in 100 cc. of absolute ethanol. The three resultant solutions were mixed in equal quantities and the member was soaked in the mixture and allowed to air dry. Upon exposure the member produces variations in shades, gradually changing from orange to yellow to green to brown to blue and then to a purplish color as the pH increases in alkalinity. The test is sensitive enough to enable an estimation to the tenth of a pH reading, showing a definite color change every 0.2 of pH difference in the range of about 4 to 8.

The member 7 identified by the indicia 5 printed thereon is sensitized to the presence of blood, which is highly abnormal in the oral cavity. Blood in this location could represent, for example, systemic involvement or the beginning of the peridontal disease gingivitis. A mixture in the proportion of one part orthotoluidine, one part barium peroxide, one part tartaric acid, and five parts lead acetate on the member turns blue in the presence of blood and becomes darker as the blood concentration increases.

The member carrying the indicia 6 thereon is sensitized to agmatine (guanidino-butylamine) which is a chemical associated with the putrifaction or breakdown of oral tissues. The sensitizing materials are one part 5% sodium nitroprusside, five parts 3% hydrogen peroxide, one part 10% sodium hydroxide, and eight parts water. This mixture applied and air dried on the member, forming a light buff color which changes to a rose pink when the test is positive. It is noted that the minimum lethal dose of sodium nitroprusside is 200 mg. per kilogram of body weight. The amount of this chemical actually used in sensitizing a member of the indicated size is generally less than 0.054 mg. and very little if any is removed and deposited in the oral cavity by contact with saliva. Thus there is little danger of ill effects from the use of this chemical in the manner noted.

In use, the device is simply inserted into the patient's mouth and exposed to exhaled breath and saliva. The curvature of the cross-bar 3 aids in wetting the members 7 substantially simultaneously. The desired color changes in all the members usually occurs within ten to fifteen seconds after exposure and not over two minutes in any case. The color intensity in the members identifying a chemical is in direct relation to the quantity of the chemical present, thus providing a quantitative as well as a qualitative analysis. All the noted chemicals after application appear to be stable indefinitely although color readings should be completed before the lapse of ten to fifteen minutes after exposure for maximum accuracy. A suitable chart (not shown) indicating the colors of the various members under all anticipated conditions is a useful adjunct to the described device and method.

Figure 3:
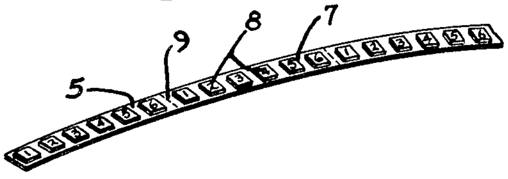
FIG. 3 is a perspective view of a length of tape which may be used in the manufacture of the device illustrated in FIG. 1.

In manufacturing the device it may be desirable to first apply the sensitized members 7 in the proper repeating sequence on a continuous tape which is subsequently cut into lengths for application to the cross-bar 3. Referring to FIG. 3, such a tape is shown wherein the members are applied in a sequence of one through six along the tape and a perforation or mark 9 clearly indicates the place where tape is to be torn or cut for application to the carrier. If desired, a single carrier may be used and a new length tape having six members thereon applied to the carrier for each test.

Figure 4:
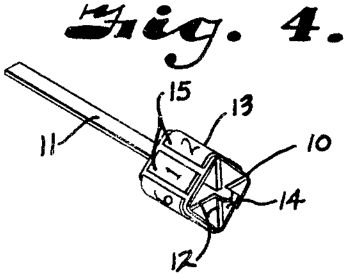
FIG. 4 is a modified form of diagnostic device embodying this invention.

An additional embodiment of this invention is illustrated in FIG. 4 wherein the device or carrier is enlarged into a box-like configuration at 10. In this embodiment the elongated handle 11 has at one end thereof radiating supports 12 which form respective corners 13 about which a supporting tape or wall member 14 may be placed which in turn retains the members 15 in outwardly exposed relation. The embodiment of FIG. 4 is conveniently rolled over wet portions of the oral cavity to produce substantially simultaneous exposure of all the members to the unknown agents in the saliva and exhaled breath.

Although certain forms of this invention have been illustrated and described, it is not to be limited thereto except insofar as such limitations are included in the claims.

What I claim and desire to secure by Letters Patent is:

1. A clinical device for diagnosing the causative factors of halitosis comprising:

(a) a carrier having a portion adapted for insertion into the oral cavity of a person for contact with oral moisture therein, said portion having a plurality of outwardly exposed members thereon, said members having identifying means associated therewith, (b) said members respectively being sensitized with compounds which are specifically color sensitive to agents found in the oral cavity associated with the production of offensive odors, (c) said carrier comprising an elongated stem adapted for grasping by the fingers, (d) a cross-bar secured to and extending transversely of said stem near one end thereof, (e) said cross-bar being curved from end-to-end and having said absorbent members on the convex side thereof in side-by-side relation.

2. A clinical device for diagnosing the causative factors of halitosis comprising:

(a) a carrier having a portion adapted for insertion into the oral cavity of a person for contact with oral moisture therein, said portion having a plurality of outwardly exposed members thereon, said members having identifying means associated therewith, (b) said members respectively being sensitized with compounds which are specifically color sensitive to agents found in the oral cavity associated with the production of offensive odors, (c) a strip mounting said members in side-by-side relation, (d) said strip being secured on said carrier.

3. A device for diagnosing the causative factors of halitosis including:

(a) a carrier having a portion adapted for insertion into the oral cavity of a person for contact with oral moisture therein, said portion having a plurality of externally exposed absorbent members thereon, (b) said members respectively having impregnated therein various compounds respectively color responsive to selected agents found in oral moisture which are associated with the production of offensive odors, providing simultaneous diagnosis of the presence of said agents in the oral cavity, (c) at least two of said compounds being respectively color sensitive to different members selected from the group consisting of hydrogen sulfide, methyl mercaptan, sulphur dioxide, succinic acid, hydrogen ion concentration, blood and agmatine, (d) said compounds being selected from the group consisting of lead acetate, stannous chloride, oxine powder, a mixture of methyl red and bromthymol blue and phenol red, a mixture of orthotoluidine and barium peroxide and tartaric acid and lead acetate, and a mixture of sodium nitroprusside and hydrogen peroxide and sodium hydroxide.

4. A clinical device for diagnosing the causative factors of halitosis comprising, (a) a carrier having a portion adapted for insertion into the oral cavity of a person for contact with oral moisture therein, said portion having six externally exposed inert absorbent members thereon, said members each having identifying indicia associated therewith, (b) said members respectively having impregnated therein compounds which are lead acetate, stannous chloride, oxine powder, a mixture of methyl red and bromthymol blue and phenol red, a mixture of orthotoluidine and barium peroxide and tartaric acid and lead acetate, a mixture of sodium nitroprusside and hydrogen peroxide and sodium hydroxide, (c) said impregnated absorbent members being characterized by being responsive when contacted with oral moisture in the oral cavity to a respective agent associated with production of offensive odors.

5. The method of diagnosing causative factors of halitosis comprising:

(a) sensitizing a plurality of absorbative members by impregnating the respective members with lead acetate, stannous chloride, oxine powder, a mixture of methyl red and bromthymol blue and phenol red, a mixture of orthotoluidine and barium peroxide and tartaric acid and lead acetate, and a mixture of sodium nitroprusside and hydrogen peroxide and sodium hydroxide, (b) mounting said members in exposed relation on a carrier, (c) inserting said carrier in the oral cavity for substantially simultaneously exposing all of said members to saliva and exhaled breath, and (d) allowing sufficient time for color reaction to occur.

6. The method of diagnosing causative factors of halitosis, comprising:

(a) sensitizing a plurality of absorbative members with compounds which are respectively color sensitive to hydrogen sulfide, sulphur dioxide, succinic acid, hydrogen ion concentration, blood, and agmatine, (b) mounting said members in exposed relation on a carrier, (c) inserting said carrier in the oral cavity and substantially simultaneously exposing all of said members to saliva and exhaled breath, and (d) allowing sufficient time for color reaction to occur.

7. The method of diagnosing causative factors of halitosis, comprising:

(a) sensitizing at least two absorbative members with compounds which are respectively color sensitive to different members selected from the group consisting of hydrogen sulfide, methyl mercaptan, sulphur dioxide, succinic acid, hydrogen ion concentration, blood, and agmatine, (b) said compound being selected from the group consisting of lead acetate, stannous chloride, oxine powder, a mixture of methyl red and bromthymol blue and phenol red, a mixture of orthotoluidine and barium peroxide and tartaric acid and lead acetate, and a mixture of sodium nitroprusside and hydrogen peroxide and sodium hydroxide, (c) mounting said members in exposed relation on a carrier, (d) inserting said carrier in the oral cavity and substantially simultaneously exposing all of said members to saliva and exhaled breath, and (e) allowing sufficient time for color reaction to occur.

References Cited

UNITED STATES PATENTS

| | | | |
|---|---|---|---|
| 1,967,557 | 7/1934 | John | 23—253 |
| 2,418,033 | 3/1947 | Kamlet | 23—230 |
| 2,452,385 | 10/1948 | Merckel | 23—230 |
| 2,567,445 | 9/1951 | Parker | 23—253 |
| 2,785,106 | 3/1957 | Mendelsohn | 424—28 |
| 3,212,855 | 10/1965 | Rebar et al. | 23—253 |
| 3,238,020 | 3/1966 | Eiseman | 23—253 |
| 2,841,138 | 7/1958 | Laub | 128—2 |
| 2,848,308 | 8/1958 | Free | 23—253 |
| 2,850,903 | 9/1958 | Schwerin | 128—2 |

RICHARD A. GAUDET, Primary Assistant

K. L. HOWELL, Assistant Examiner

U.S. Cl. X.R.

424—7; 252—408; 23—253